(12) United States Patent
Tripathi et al.

(10) Patent No.: US 7,944,923 B2
(45) Date of Patent: May 17, 2011

(54) METHOD AND SYSTEM FOR CLASSIFYING NETWORK TRAFFIC

(75) Inventors: Sunay Tripathi, San Jose, CA (US); Erik Nordmark, Mountain View, CA (US); Nicolas G. Droux, Rio Rancho, NM (US)

(73) Assignee: Oracle America, Inc., Redwood City, CA (US)

( * ) Notice: Subject to any disclaimer, the term of this patent is extended or adjusted under 35 U.S.C. 154(b) by 200 days.

(21) Appl. No.: 12/053,666

(22) Filed: Mar. 24, 2008

(65) Prior Publication Data
US 2009/0238189 A1  Sep. 24, 2009

(51) Int. Cl.
*H04L 12/28* (2006.01)
(52) U.S. Cl. .................................. 370/392; 370/412
(58) Field of Classification Search .................. None
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,269,401 B1 | 7/2001 | Fletcher et al. | |
| 6,477,643 B1 | 11/2002 | Vorbach et al. | |
| 6,594,775 B1 | 7/2003 | Fair | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,771,595 B1 | 8/2004 | Gilbert et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 6,985,937 B1 | 1/2006 | Keshav et al. | |
| 7,046,665 B1 | 5/2006 | Walrand et al. | |
| 7,111,303 B2 | 9/2006 | Macchiano et al. | |

(Continued)

FOREIGN PATENT DOCUMENTS
WO  2005057318 A2  6/2005
(Continued)

OTHER PUBLICATIONS

Tripathi, S.; "Solaris Networking—The Magic Revealed (Part I)"; Sunay Tripathi's Solaris Networking Weblog; Nov. 14, 2005, pp. 1-22 (22 pages).

(Continued)

*Primary Examiner* — Chirag G Shah
*Assistant Examiner* — Daniel Mitchell
(74) *Attorney, Agent, or Firm* — Osha • Liang LLP

(57) ABSTRACT

A system includes a physical NIC associated with the computer and including receive rings for storing network traffic addressed to the VNIC, where the receive rings include a local receive ring for storing local traffic and a forwarding receive ring for storing forwarding traffic. The physical NIC further includes a hardware classifier configured to register a local Internet Protocol (IP) address associated with the VNIC in a lookup table, receive a packet including a destination IP address, classify the packet as local traffic or forwarding traffic using the lookup table, and store the packet in the local receive ring or the forwarding receive ring based on the type. The VNIC is configured to retrieve the packet from the receive ring, and process the packet in a type-specific manner based on the receive ring where the packet was stored, where the type-specific manner is different for local traffic and forwarding traffic.

8 Claims, 11 Drawing Sheets

U.S. PATENT DOCUMENTS

| | | | |
|---|---|---|---|
| 7,146,431 B2 | 12/2006 | Hipp et al. | |
| 7,177,311 B1 | 2/2007 | Hussain et al. | |
| 7,200,704 B2 | 4/2007 | Njoku et al. | |
| 7,260,102 B2 | 8/2007 | Mehrvar et al. | |
| 7,313,142 B2 | 12/2007 | Matsuo et al. | |
| 7,450,498 B2 | 11/2008 | Golia et al. | |
| 7,502,884 B1* | 3/2009 | Shah et al. | 710/316 |
| 7,561,531 B2 | 7/2009 | Lewites et al. | |
| 7,620,955 B1 | 11/2009 | Nelson | |
| 7,633,955 B1 | 12/2009 | Saraiya et al. | |
| 7,688,838 B1* | 3/2010 | Aloni et al. | 370/412 |
| 7,694,298 B2 | 4/2010 | Goud et al. | |
| 7,730,486 B2 | 6/2010 | Herington | |
| 2002/0052972 A1 | 5/2002 | Yim | |
| 2002/0080721 A1 | 6/2002 | Tobagi et al. | |
| 2003/0037154 A1 | 2/2003 | Poggio et al. | |
| 2003/0120772 A1 | 6/2003 | Husain et al. | |
| 2004/0015966 A1 | 1/2004 | MacChiano et al. | |
| 2004/0170127 A1 | 9/2004 | Tanaka | |
| 2004/0199808 A1 | 10/2004 | Freimuth et al. | |
| 2004/0202182 A1 | 10/2004 | Lund et al. | |
| 2004/0210623 A1 | 10/2004 | Hydrie et al. | |
| 2004/0267866 A1 | 12/2004 | Carollo et al. | |
| 2005/0111455 A1 | 5/2005 | Nozue et al. | |
| 2005/0135243 A1 | 6/2005 | Lee et al. | |
| 2005/0138620 A1 | 6/2005 | Lewites | |
| 2005/0182853 A1* | 8/2005 | Lewites et al. | 709/238 |
| 2005/0251802 A1 | 11/2005 | Bozek et al. | |
| 2006/0041667 A1 | 2/2006 | Ahn et al. | |
| 2006/0045089 A1 | 3/2006 | Bacher et al. | |
| 2006/0070066 A1 | 3/2006 | Grobman | |
| 2006/0092928 A1 | 5/2006 | Pike et al. | |
| 2006/0174324 A1 | 8/2006 | Zur et al. | |
| 2006/0206300 A1 | 9/2006 | Garg et al. | |
| 2006/0206602 A1 | 9/2006 | Hunter et al. | |
| 2006/0233168 A1* | 10/2006 | Lewites et al. | 370/389 |
| 2006/0236063 A1 | 10/2006 | Hausauer et al. | |
| 2006/0253619 A1 | 11/2006 | Torudbakken et al. | |
| 2007/0047536 A1 | 3/2007 | Scherer et al. | |
| 2007/0078988 A1 | 4/2007 | Miloushev et al. | |
| 2007/0083723 A1 | 4/2007 | Dey et al. | |
| 2007/0101323 A1 | 5/2007 | Foley et al. | |
| 2007/0244937 A1 | 10/2007 | Flynn et al. | |
| 2007/0244972 A1 | 10/2007 | Fan | |
| 2008/0002683 A1 | 1/2008 | Droux et al. | |
| 2008/0005748 A1 | 1/2008 | Mathew et al. | |
| 2008/0019365 A1 | 1/2008 | Tripathi et al. | |
| 2008/0022016 A1 | 1/2008 | Tripathi et al. | |
| 2008/0043765 A1 | 2/2008 | Belgaied et al. | |
| 2008/0144635 A1* | 6/2008 | Carollo et al. | 370/397 |
| 2008/0171550 A1 | 7/2008 | Zhao | |
| 2008/0192648 A1* | 8/2008 | Galles | 370/254 |
| 2008/0225875 A1 | 9/2008 | Wray et al. | |
| 2008/0239945 A1 | 10/2008 | Gregg | |
| 2008/0253379 A1 | 10/2008 | Sasagawa | |
| 2008/0270599 A1 | 10/2008 | Tamir et al. | |
| 2009/0006593 A1 | 1/2009 | Cortes | |
| 2009/0125752 A1 | 5/2009 | Chan et al. | |
| 2010/0046531 A1 | 2/2010 | Louati et al. | |

FOREIGN PATENT DOCUMENTS

| | | | |
|---|---|---|---|
| WO | 2008093174 A1 | 8/2008 | |

OTHER PUBLICATIONS

Tripathi, S.; "CrossBow: Solaris Network Virtualization and Resource Control"; Crossbow Architectual Document, Nov. 21, 2006; 19 pages.

Nordmark, E. et al. ; "IP Instances Interface Document"; PSARC 2006/366, Dec. 28, 2006; 17 pages.

Nordmark, E.; "IP Instances Design Document"; PSARC 2006/366, Dec. 21, 2006; 38 pages.

Tripathi, S.; "CrossBow: Solaris Network Virtualization & Resource Control"; CrossBow Overview Document, Aug. 23, 2006; 12 pges.

Nordmark, E.; "IP Instances—Network Isolation Meets Zones"; presented at the SVOSUG meeting, Oct. 26, 2006; 28 pages.

Tripathi, S.; "CrossBow: Network Virtualization and Resource Control"; presented at the SVOSUG meeting, Aug. 24, 2006; 28 pages.

Tripathi, S.; "Crossbow: ReCap"; presented at an internal Sun Labs Open House presentation on Jun. 1, 2006, made public Aug. 2006; 23 pages.

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

Kumar, R., ASI and PCI Express: Complementary Solutions, Dec. 2004, RTC Magazine, Retrieved from the Internet <rtcmagazine.com/articles/view/100274>, 5 pages.

Martinez, R., Alfaro, F.J., and Sanchez, J.L., Providing Quality of Service Over Advanced Switching, 2006, IEEE, Retrieved from the Internet, <ieeexplore.ieee.org/xpls/abs_all.jsp?arnumber=1655667& tag=1>, 10 pages.

Apani, Brave New World, Feb. 1, 2007, iSmile, Retrieved from the Internet, <isimile.com/PDFs/Apani_Segmentation_WP.pdf>, 8 pages.

Trapeze, Trapeze Overview, 1998, USENIX, Retrieved from the Internet, <usenix.org/publications/library/proceedings/usenix98/full_papers/anderson/anderson_html/node4.html>, 2 pages.

Popuri, S., OpenSolaris Virtualization Technologies, Feb. 23, 2007, Retrieved from the Internet,<hub.opensolaris.org/bin/view/Community+Group+advocacy/techdays%2Darchive%2D06%2D07>, 42 pages.

Office Action in United States Patent and Trademark Office for U.S. Appl. No. 11/953,829, Mailed Aug. 4, 2010 (30 Pages).

Office Action in United States Patent and Trademark Office for U.S. Appl. No. 11/953,837, Mailed Jun. 11, 2010 (27 Pages).

Office Action in United States Patent and Trademark Office for U.S. Appl. No. 11/953,839, Mailed Aug. 19, 2010 (30 Pages).

Office Action in United States Patent and Trademark Office for U.S. Appl. No. 12/040,165, Mailed Feb. 8, 2010 (40 Pages).

Notice of Allowance in Unites States Patent and Trademark Office for U. S. Appl. No. 12/040,165, Mailed Oct. 29, 2010 (18 Pages).

Office Action inUnited States Patent and Trademark Office for U.S. Appl. No. 12/040,101, Mailed May 6, 2010 (39 Pages).

Office Action in United States Patent and Trademark Office for U.S. Appl. No. 11/953,842, Mailed Apr. 30, 2010 (39 Pages).

Final Offic Action United States Patent and Trademark Office for U.S. Appl. No. 11/953,842, Mailed Oct. 15, 2010 (32 Pages).

Office Action in United States Patent and Trademark Office for U.S. Appl. No. 12/040,105, Mailed Nov. 20, 2009 (93 Pages).

Final Office Action in United States Patent and Trademark Office for U.S. Appl. No. 12/040,105, Mailed May 26, 2010 (26 Pages).

Notice of Allowance in United States Patent and Trademark Office for U.S. Appl. No. 12/040,105, Mailed Oct. 5, 2010 (27 Pages).

Office Action in Unites States Patent and Trademark Office for U.S. Appl. No. 11/953,843, Mailed May 3, 2010 (169 Pages).

Final Office Action in United States Patent and Trademark Office for U.S. Appl No 11/953,843, Mailed Oct. 15, 2010 (33 Pages).

Office Action in United States Patent and Trademark Office for U.S. Appl. No. 12/053,666, Mailed Dec. 10, 2009 (36 Pages).

Final Office Action in United Stats Patent and Trademark Office for U.S. Appl. No. 12/053,666, Mailed Jun. 11, 2010 (27 Pages).

Notice of Allowance in United States Patent and Trademark Office for U.S. Appl. No. 12/053,666, Mailed Oct. 7, 2010 (15 Pages).

Office Action in Unites States Patent and Trademark Office for U.S. Appl. No. 12/053,676, Mailed Dec. 9, 2009 (41 Pages).

Notice of Allowance in United States Patent and Trademark Office for U.S. Appl. No. 12/053,676, Mailed Jul. 15, 2010 (20 Pages).

Goldenberg, D. et al.; "Zero Copy Sockets Direct Protocol over InfiniBand - Preliminary Implementation and Performance Analysis"; Proceedings of the 13th Symposium on High Performance Interconnects; Piscataway, NJ; Aug. 17-19, 2005; pp. 128-137 (10 Pages).

"I/O Virtualization Using Mellanox InfiniBand and Channel I/O Virtualization (CIOV) Technology"; XP-002541674; 2007; Retrieved from the Internet: <http://www.mellanox.com/pdf/whitepapersWP_Virtualize_with_IB.pdf>; pp. 1-16 (16 pages).

"InfiniBand Software Stack"; XP-002541744; Jan. 1, 2006; Retrieved from the Internet: <http://download.microsoft.com/download/c/3/1/c318044c-95e8-4df9-a6af-81cdcb3c53c5/

Mellanox%20Technologies%20-%20Infiniband%20Software%20Stack%20-%20WinIB%20-%20external.PDF>, pp. 1-2 (2 pages).

Wheeler, B.; "10 Gigabit Ethernet in Servers: Benefits and Challenges"; XP-002541745; Jan. 2005; Retrieved from the Internet: <http://www.hp.com/products1/serverconnectivity/adapters/ethernet/10gbe/infolibrary/10GbE_White_Paper.pdf> (8 pages).

"Windows Platform Design Notes: Winsock Direct and Protocol Offload on SANs"; XP-002541746; Mar. 3, 2001; Retrieved from the Internet: <http://download.microsoft.com/download/1/6/1/161ba512-40e2-4cc9-843a-923143f3456c/WinsockDirect-ProtocolOffload.doc> (8 pages).

International Search Report from PCT/US2009/048594 dated Sep. 7, 2009 (4 pages).

Written Opinion from PCT/US2009/048594 dated Sep. 7, 2009 (1 page).

International Search Report dated Aug. 19, 2009 (3 pages).

International Preliminary Report on Patentability issued in PCT/US2009/035405, Dated Sep. 10, 2010. (9 Pages).

Tripathi, S.; "Crossbow Architectural Document"; Nov. 21, 2006; 19 pages.

Nordmark; E.; "IP Instances - Network Isolation Meets Zones"; presented at SVOSUG, Oct. 26, 2006; 28 pages.

Tripathi, S.; "CrossBow: Network Virtualization and Resource Control"; presented at SVOSUG, Aug. 24, 2006; 27 pages.

Tripathi, S.; "CrossBow: Network Virtualization and Resource Control"; presented at Sun Labs Open House; Jun. 1, 2006; 24 pages.

Final Office Action in United States Patent and Trademark Office for U.S. Appl. No. 12/040,101, Mailed Dec. 13, 2010 (25 Pages).

* cited by examiner

METHOD AND SYSTEM FOR CLASSIFYING NETWORK TRAFFIC

CROSS-REFERENCE TO RELATED APPLICATIONS

The present application contains subject matter that may be related to the subject matter in the following commonly-owned U.S. applications: U.S. patent application Ser. No. 11/489,942, entitled "Multiple Virtual Network Stack Instances using Virtual Network Interface Cards," in the names of Nicolas G. Droux, Erik Nordmark, and Sunay Tripathi; U.S. patent application Ser. No. 11/480,000, entitled "Method and System for Controlling Virtual Machine Bandwidth" in the names of Sunay Tripathi, Tim P. Marsland, and Nicolas G. Droux; and U.S. patent application Ser. No. 11/480,261, entitled "Virtual Switch," in the names of Nicolas G. Droux, Sunay Tripathi, and Erik Nordmark.

The present application contains subject matter that may be related to the subject matter in the following U.S. applications filed on Dec. 10, 2007, and assigned to the assignee of the present application: "Method and System for Creating a Virtual Network Path" with U.S. application Ser. No. 11/953,829; "Method and System for Controlling Network Traffic In a Blade" with U.S. application Ser. No. 11/953,832; "Method and System for Reconfiguring a Virtual Network Path" with U.S. application Ser. No. 11/953,837; "Method and System for Enforcing Resource Constraints For Virtual Machines Across Migration" with U.S. application Ser. No. 11/953,839; and "Method and System for Monitoring Virtual Wires" with U.S. application Ser. No. 11/953,842.

The present application contains subject matter that may be related to the subject matter in the following U.S. applications filed on Feb. 29, 2008, and assigned to the assignee of the present application: "Method and System for Transferring Packets to a Guest Operating System" with U.S. application Ser. No. 12/040,101 and "Method and System for Media-Based Data Transfer" with U.S. application Ser. No. 12/040,105.

BACKGROUND

Conventionally, in the computer-related arts, a network is an arrangement of physical computer systems configured to communicate with each other. In some cases, the physical computer systems include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (using a tangible connection medium such as Ethernet cables) or wireless (using an intangible connection medium such as radio waves). Different connection methods may also be combined in a single network. For example, a wired network may be extended to allow devices to connect to the network wirelessly. However, core network components such as routers, switches, and servers are generally connected using physical wires. Ethernet is defined within the Institute of Electrical and Electronics Engineers (IEEE) 802.3 standards, which are supervised by the IEEE 802.3 Working Group.

To create a wired network, computer systems must be physically connected to each other. That is, the ends of physical wires (for example, Ethernet cables) must be physically connected to network interface cards in the computer systems forming the network. To reconfigure the network (for example, to replace a server or change the network topology), one or more of the physical wires must be disconnected from a computer system and connected to a different computer system.

Further, when transferring data between computer systems in a network, a packet often passes through one or more computer systems for which the packet is not destined. These computer systems may be thought of as "forwarding nodes." For example, routers, switches, and load balancers generally act as forwarding nodes. Many different types of forwarding nodes exist. For a forwarding node to successfully forward the packet, the forwarding node typically examines the destination Internet Protocol (IP) address included in the packet, and performs a route lookup using the IP address to determine where to forward the packet. The route lookup is typically performed for every packet the forwarding node receives, which can be very resource-intensive depending on the amount of network traffic being processed by the forwarding node.

SUMMARY

In general, in one aspect, the invention relates to a system. The system comprises a computer comprising a virtual network interface card (VNIC). The system further comprises a physical network interface card (physical NIC) associated with the computer and comprising a plurality of receive rings for storing network traffic addressed to the VNIC, wherein the plurality of receive rings comprises a local receive ring for storing local traffic and a forwarding receive ring for storing forwarding traffic. The physical NIC further comprises a hardware classifier configured to register a local Internet Protocol (IP) address associated with the VNIC in a lookup table, receive a packet comprising a destination IP address, classify the packet as a type selected from a group consisting of local traffic and forwarding traffic using the lookup table, wherein the destination IP address matches the local IP address for local traffic and the destination IP address does not match the local IP address for forwarding traffic, and store the packet in one selected from a group consisting of the local receive ring and the forwarding receive ring based on the type. The VNIC is configured to retrieve the packet from the receive ring, and process the packet in a type-specific manner based on the receive ring where the packet was stored, wherein the type-specific manner is different for local traffic and forwarding traffic.

In general, in one aspect, the invention relates to a system. The system comprises a plurality of virtual machines associated with a plurality of virtual network interface cards (VNICs) and located in a plurality of computers communicatively coupled with each other via a chassis interconnect. The system further comprises a network express manager comprising a plurality of receive rings for storing network traffic addressed to the plurality of VNICs, wherein the plurality of receive rings comprises a local receive ring for storing local traffic and a forwarding receive ring for storing forwarding traffic. The network express manager further comprises a hardware classifier configured to register a local Internet Protocol (IP) address associated with a VNIC selected from the plurality of VNICs in a lookup table, receive a packet addressed to the VNIC and comprising a destination IP address, classify the packet as a type selected from a group consisting of local traffic and forwarding traffic using the lookup table, wherein the destination IP address matches the local IP address for local traffic and the destination IP address does not match the local IP address for forwarding traffic, and store the packet in one selected from a group consisting of the local receive ring and the forwarding receive ring based on the type. The VNIC is configured to retrieve the packet from the receive ring, and process the packet in a type-specific manner based on the receive ring where the packet was stored, wherein the type-specific manner is different for local traffic and forwarding traffic.

In general, in one aspect, the invention relates to a method for classifying network traffic. The method comprises registering a local Internet Protocol (IP) address associated with a virtual network interface card (VNIC) in a lookup table, receiving a packet comprising a destination IP address, and classifying the packet as a type selected from the group consisting of local traffic and forwarding traffic using the lookup table, wherein the destination IP address matches the local IP address for local traffic and the destination IP address does not match the local IP address for forwarding traffic. The method further comprises storing the packet in a receive ring selected from a plurality of receive rings associated with the VNIC based on the type, wherein the plurality of receive rings comprises a local receive ring for storing local traffic and a forwarding receive ring for storing forwarding traffic. The method further comprises processing the packet in a type-specific manner based on the receive ring where the packet was stored, wherein the type-specific manner is different for local traffic and forwarding traffic.

Other aspects of the invention will be apparent from the following description and the appended claims.

DETAILED DESCRIPTION

Figure 1:
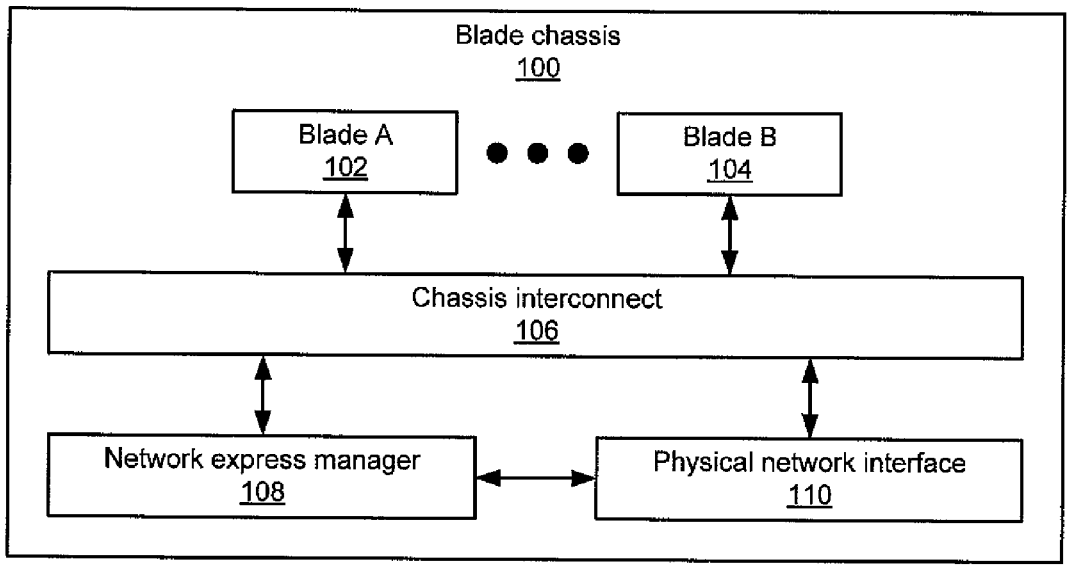
FIG. 1 shows a diagram of a blade chassis in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for classifying network traffic. A local IP address of a virtual network interface card (VNIC) is registered with a hardware classifier. When the hardware classifier receives a packet, the hardware classifier determines whether the packet is local traffic or forwarding traffic. Local traffic and forwarding traffic are stored in separate receive rings, and are subsequently processed differently.

In one or more embodiments of the invention, the VNIC is a node in a virtual network path located in a blade chassis. Specifically, the VNIC may be an endpoint of a "virtual wire" located in the blade chassis. The concept of a virtual wire is discussed in detail below. Further, the hardware classifier may be located in a network express manager used to manage network traffic for computers in the blade chassis. Alternatively, the hardware classifier may be located in a physical NIC.

FIG. 1 shows a diagram of a blade chassis (100) in accordance with one or more embodiments of the invention. The blade chassis (100) includes multiple blades (e.g., blade A (102), blade B (104)) communicatively coupled with a chassis interconnect (106). For example, the blade chassis (100) may be a Sun Blade 6048 Chassis by Sun Microsystems Inc., an IBM BladeCenter® chassis, an HP BladeSystem enclosure by Hewlett Packard Inc., or any other type of blade chassis. The blades may be of any type(s) compatible with the blade chassis (100). BladeCenter® is a registered trademark of International Business Machines, Inc. (IBM), headquartered in Armonk, N.Y.

In one or more embodiments of the invention, the blades are configured to communicate with each other via the chassis interconnect (106). Thus, the blade chassis (100) allows for communication between the blades without requiring traditional network wires (such as Ethernet cables) between the blades. For example, depending on the type of blade chassis (100), the chassis interconnect (106) may be a Peripheral Component Interface Express (PCI-E) backplane, and the blades may be configured to communicate with each other via PCI-E endpoints. Those skilled in the art will appreciate that other connection technologies may be used to connect the blades to the blade chassis.

Continuing with the discussion of FIG. 1, to communicate with clients outside the blade chassis (100), the blades are configured to share a physical network interface (110). The physical network interface (110) includes one or more network ports (for example, Ethernet ports), and provides an interface between the blade chassis (100) and the network (i.e., interconnected computer systems external to the blade chassis (100)) to which the blade chassis (100) is connected. The blade chassis (100) may be connected to multiple networks, for example using multiple network ports.

In one or more embodiments, the physical network interface (110) is managed by a network express manager (108). Specifically, the network express manager (108) is configured to manage access by the blades to the physical network interface (110). The network express manager (108) may also be configured to manage internal communications between the blades themselves, in a manner discussed in detail below. The network express manager (108) may be any combination of hardware, software, and/or firmware including executable logic for managing network traffic.

Figure 2:
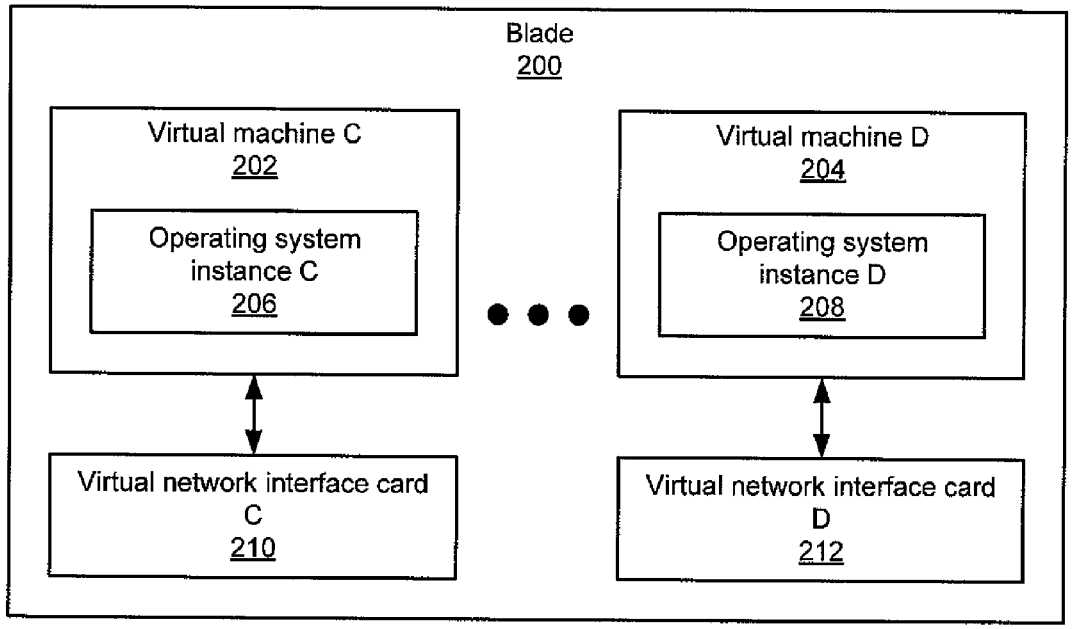
FIG. 2 shows a diagram of a blade in accordance with one or more embodiments of the invention.

FIG. 2 shows a diagram of a blade (200) in accordance with one or more embodiments of the invention. "Blade" is a term of art referring to a computer system located within a blade chassis (for example, the blade chassis (100) of FIG. 1). Blades typically include fewer components than stand-alone computer systems or conventional servers. In one or more embodiments of the invention, fully featured stand-alone computer systems or conventional servers may also be used instead of (or in combination with) the blades. Generally, blades in a blade chassis each include one or more processors and associated memory. Blades may also include storage devices (for example, hard drives and/or optical drives) and numerous other elements and functionalities typical of today's computer systems (not shown), such as a keyboard, a mouse, and/or output means such as a monitor. One or more of the aforementioned components may be shared by multiple blades located in the blade chassis. For example, multiple blades may share a single output device.

Continuing with discussion of FIG. 2, the blade (200) includes a host operating system (not shown) configured to execute one or more virtual machines (e.g., virtual machine C (202), virtual machine D (204)). Broadly speaking, the virtual machines are distinct operating environments configured to inherit underlying functionality of the host operating system via an abstraction layer. In one or more embodiments of the invention, each virtual machine includes a separate instance of an operating system (e.g., operating system instance C (206), operating system instance D (208)). For example, the Xen® virtualization project allows for multiple guest operating systems executing in a host operating system. Xen® is a trademark overseen by the Xen Project Advisory Board. In one or more embodiments of the invention, the host operating system supports virtual execution environments (not shown). An example of virtual execution environment is a Solaris™ Container. In such cases, the Solaris™ Container may execute in the host operating system, which may be a Solaris™ operating system. Solaris™ is a trademark of Sun Microsystems, Inc. In one or more embodiments of the invention, the host operating system may include both virtual machines and virtual execution environments.

Many different types of virtual machines and virtual execution environment exist. Further, the virtual machines may include many different types of functionality, such as a switch, a router, a firewall, a load balancer, an application server, any other type of network-enabled service, or any combination thereof.

In one or more embodiments of the invention, the virtual machines and/or virtual execution environments inherit network connectivity from the host operating system via VNICs (e.g., VNIC C (210), VNIC D (212)). To the virtual machines and the virtual execution environments, the VNICs appear as physical NICs. In one or more embodiments of the invention, the use of VNICs allows an arbitrary number of virtual machines and/or virtual execution environments to share the blade's (200) networking functionality. Further, in one or more embodiments of the invention, each virtual machine and/or virtual execution environment may be associated with an arbitrary number of VNICs, thereby providing increased flexibility in the types of networking functionality available to the virtual machines and/or virtual execution environments. For example, a virtual machine may use one VNIC for incoming network traffic, and another VNIC for outgoing network traffic.

VNICs in accordance with one or more embodiments of the invention are described in detail in commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi, the contents of which are hereby incorporated by reference in their entirety. VNICs in accordance with one or more embodiments of the invention also are described in detail in commonly owned U.S. patent application Ser. No. 11/480,000, entitled "Method and System for Controlling Virtual Machine Bandwidth" in the names of Sunay Tripathi, Tim P. Marsland, and Nicolas G. Droux the contents of which are hereby incorporated by reference in their entirety.

Figure 3:
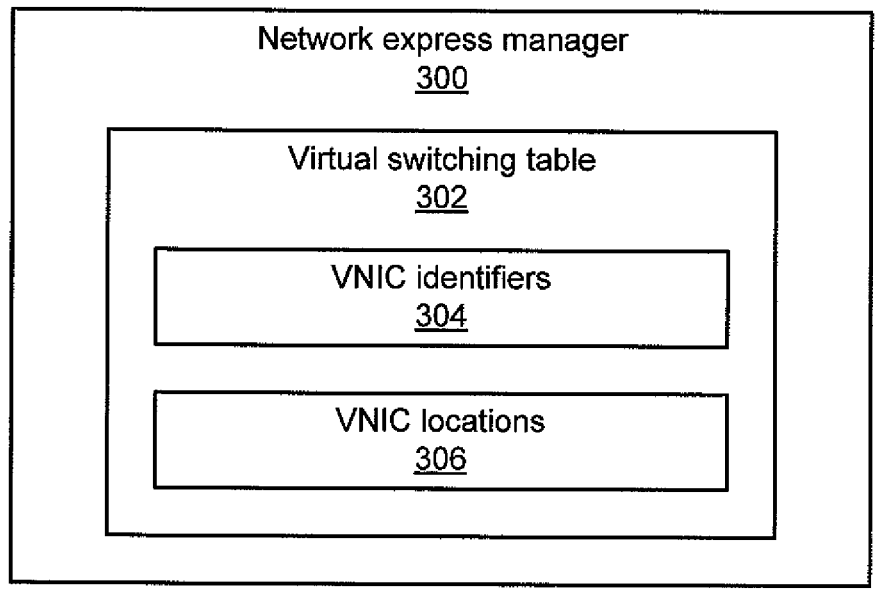
FIG. 3 shows a diagram of a network express manager in accordance with one or more embodiments of the invention.

As discussed above, each blade's networking functionality (and, by extension, networking functionality inherited by the VNICs) includes access to a shared physical network interface and communication with other blades via the chassis interconnect. FIG. 3 shows a diagram of a network express manager (300) in accordance with one or more embodiments of the invention. The network express manager (300) is configured to route network traffic traveling to and from VNICs located in the blades. Specifically, the network express manager (300) includes a virtual switching table (302), which includes a mapping of VNIC identifiers (304) to VNIC locations (306) in the chassis interconnect. In one or more embodiments, the VNIC identifiers (304) are Internet Protocol (IP) addresses, and the VNIC locations (306) are PCI-E endpoints associated with the blades (e.g., if the chassis interconnect is a PCI-E backplane). Alternatively, another routing scheme may be used.

In one or more embodiments, the network express manager (300) is configured to receive network traffic via the physical network interface and route the network traffic to the appropriate location (i.e., where the VNIC is located) using the virtual switching table (302). Further, the network express manager (300) may be configured to route network traffic between different VNICs located in the blade chassis. In one or more embodiments of the invention, using the virtual switching table (302) in this manner facilitates the creation of a virtual network path, which includes virtual wires. Thus, using the virtual switching table (302), virtual machines located in different blades may be interconnected to form an arbitrary virtual network topology, where the VNICs associated with each virtual machine do not need to know the physical locations of other VNICs. Further, if a virtual machine is migrated from one blade to another, the virtual network topology may be preserved by updating the virtual switching table (302) to reflect the corresponding VNIC's new physical location (for example, a different PCI-E endpoint).

In some cases, network traffic from one VNIC may be destined for a VNIC located in the same blade, but associated with a different virtual machine. In one or more embodiments of the invention, a virtual switch may be used to route the network traffic between the VNICs independent of the blade chassis. Virtual switches in accordance with one or more embodiments of the invention are discussed in detail in commonly owned U.S. patent application Ser. No. 11/480,261, entitled "Virtual Switch," in the names of Nicolas G. Droux, Sunay Tripathi, and Erik Nordmark, the contents of which are hereby incorporated by reference in their entirety.

Figure 4:
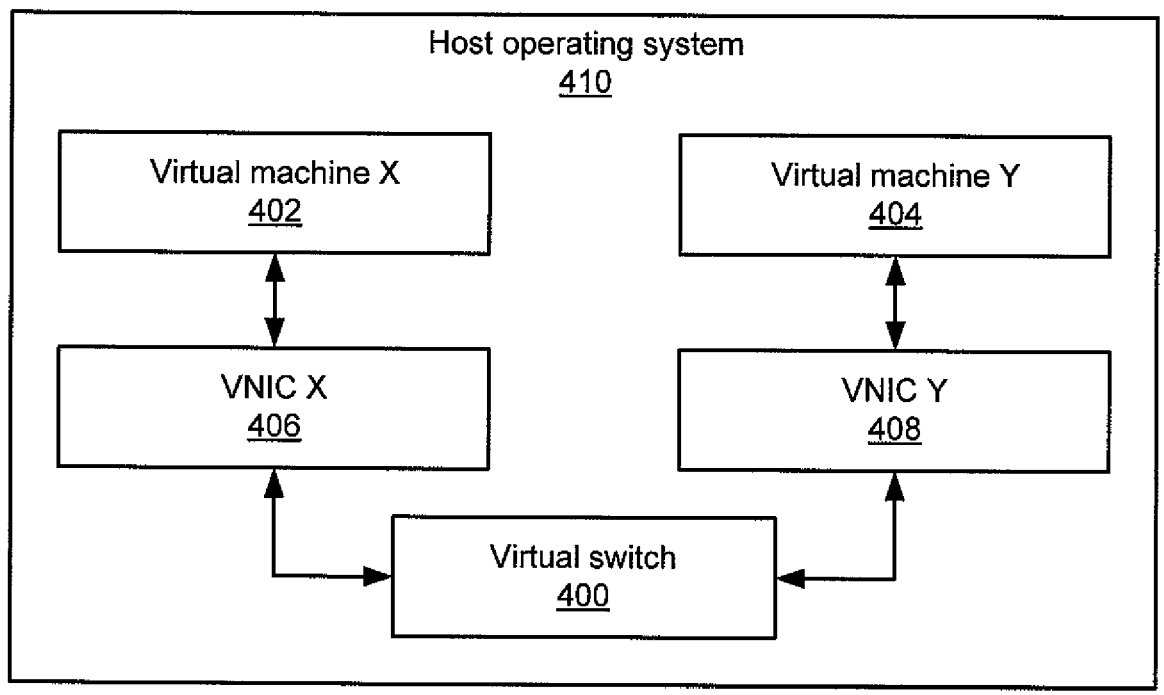
FIG. 4 shows a diagram of a virtual machine in accordance with one or more embodiments of the invention.

For example, FIG. 4 shows a diagram of a virtual switch (400) in accordance with one or more embodiments of the invention. The virtual switch (400) provides connectivity between VNIC X (406) associated with virtual machine X (402) and VNIC Y (408) associated with virtual machine Y (404). In one or more embodiments, the virtual switch (400) is managed by a host operating system (410) within which virtual machine X (402) and virtual machine Y (404) are located. Specifically, the host operating system (410) may be configured to identify network traffic targeted at a VNIC in the same blade, and route the traffic to the VNIC using the virtual switch (400). In one or more embodiments of the invention, the virtual switch (400) may reduce utilization of the blade chassis and the network express manager by avoiding unnecessary round-trip network traffic.

Figure 5:
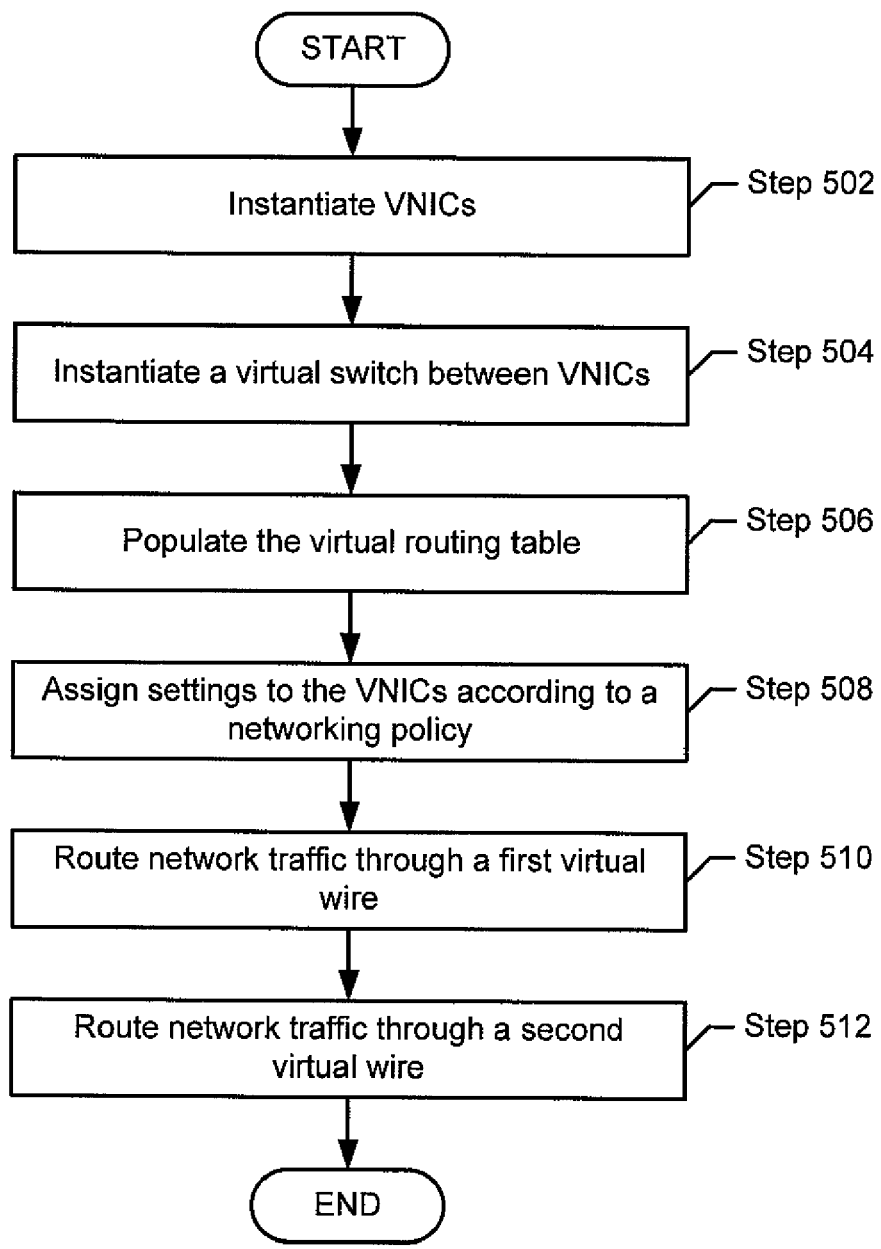
FIG. 5 shows a flowchart of a method for creating a virtual network path in accordance with one or more embodiments of the invention.

FIG. 5 shows a flowchart of a method for creating a virtual network path in accordance with one or more embodiments of the invention. In one or more embodiments of the invention, one or more of the steps shown in FIG. 5 may be omitted, repeated, and/or performed in a different order. Accordingly, embodiments of the invention should not be considered limited to the specific arrangement of steps shown in FIG. 5.

In one or more embodiments of the invention, in Step 502, VNICs are instantiated for multiple virtual machines. The virtual machines are located in blades, as discussed above. Further, the virtual machines may each be associated with one or more VNICs. In one or more embodiments of the invention, instantiating a VNIC involves loading a VNIC object in memory and registering the VNIC object with a host operating system, i.e., an operating system that is hosting the virtual machine associated with the VNIC. Registering the VNIC object establishes an interface between the host operating system's networking functionality and the abstraction layer provided by the VNIC. Thereafter, when the host operating system receives network traffic addressed to the VNIC, the host operating system forwards the network traffic to the VNIC. Instantiation of VNICs in accordance with one or more embodiments of the invention is discussed in detail in U.S. patent application Ser. No. 11/489,942, incorporated by reference above.

As discussed above, a single blade may include multiple virtual machines configured to communicate with each other. In one or more embodiments of the invention, in Step 504, a virtual switch is instantiated to facilitate communication between the virtual machines. As noted above, the virtual switch allows communication between VNICs independent of the chassis interconnect. Instantiation of virtual switches in accordance with one or more embodiments of the invention is discussed in detail in U.S. patent application Ser. No. 11/480,261, incorporated by reference above.

In one or more embodiments of the invention, in Step 506, a virtual switching table is populated. As noted above, the virtual switching table may be located in a network express manager configured to manage network traffic flowing to and from the virtual machines. Populating the virtual switching table involves associating VNIC identifiers (for example, Internet Protocol and/or Media Access Control (MAC) addresses) with VNIC locations (for example, PCI-E endpoints). In one or more embodiments of the invention, the virtual switching table is populated in response to a user command issued via a control operating system, i.e., an operating system that includes functionality to control the network express manager.

In one or more embodiments of the invention, VNICs include settings for controlling the processing of network packets. In one or more embodiments of the invention, in Step 508, settings are assigned to the VNICs according to a networking policy. Many different types of networking policies may be enforced using settings in the VNICs. For example, a setting may be used to provision a particular portion of a blade's available bandwidth to one or more VNICs. As another example, a setting may be used to restrict use of a VNIC to a particular type of network traffic, such as Voice over IP (VoIP) or Transmission Control Protocol/IP (TCP/IP). Further, settings for multiple VNICs in a virtual network path may be identical. For example, VNICs in a virtual network path may be capped at the same bandwidth limit, thereby allowing for consistent data flow across the virtual network path. In one or more embodiments of the invention, a network express manager is configured to transmit the desired settings to the VNICs.

In one or more embodiments of the invention, once the VNICs are instantiated and the virtual switching table is populated, network traffic may be transmitted from a VNIC in one blade to a VNIC in another blade. The connection between the two VNICs may be thought of as a "virtual wire," because the arrangement obviates the need for traditional network wires such as Ethernet cables. A virtual wire functions similar to a physical wire in the sense that network traffic passing through one virtual wire is isolated from network traffic passing through another virtual wire, even though the network traffic may pass through the same blade (i.e., using the same virtual machine or different virtual machines located in the blade).

Further, a combination of two or more virtual wires may be thought of as a "virtual network path." Specifically, transmitting network traffic over the virtual network path involves routing the network traffic through a first virtual wire (Step 510) and then through a second virtual wire (Step 512). For example, when receiving network traffic from a client via the physical network interface, one virtual wire may be located between the physical network interface and a VNIC, and a second virtual wire may be located between the VNIC and another VNIC.

Figure 6A:
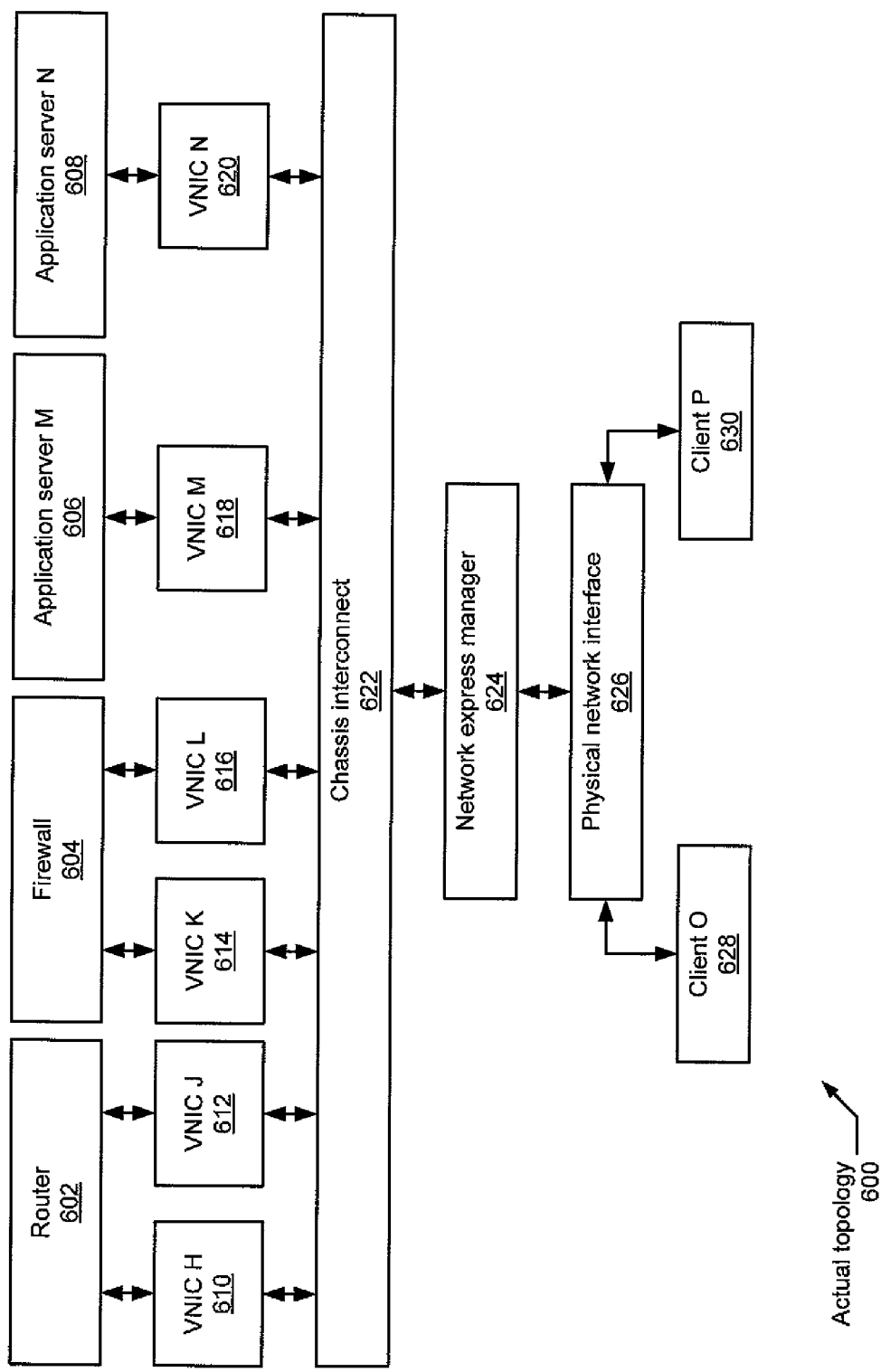
FIGS. 6A-6C show an example of creating virtual network paths in accordance with one or more embodiments of the invention.
Figure 6B:
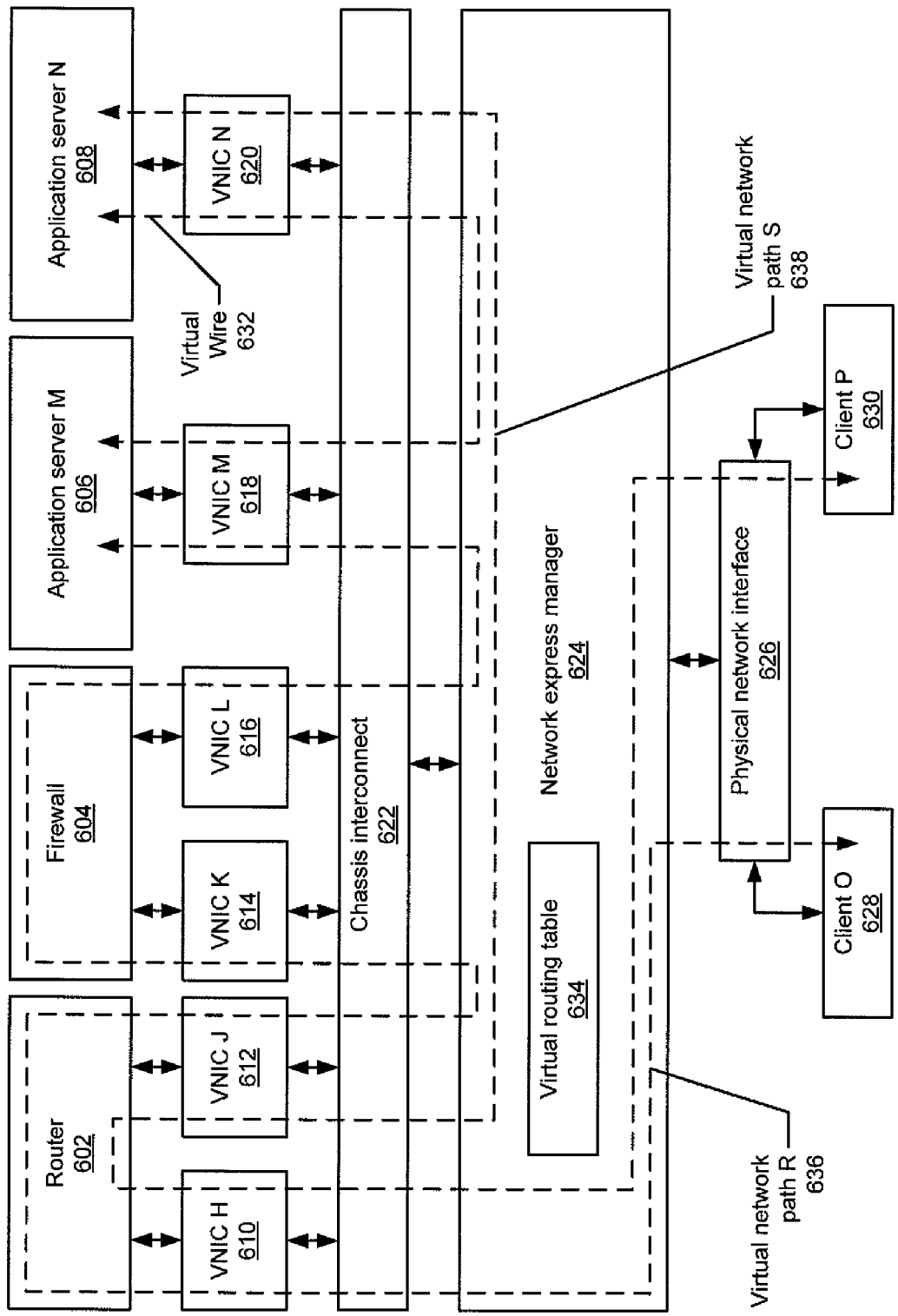
Figure 6C:
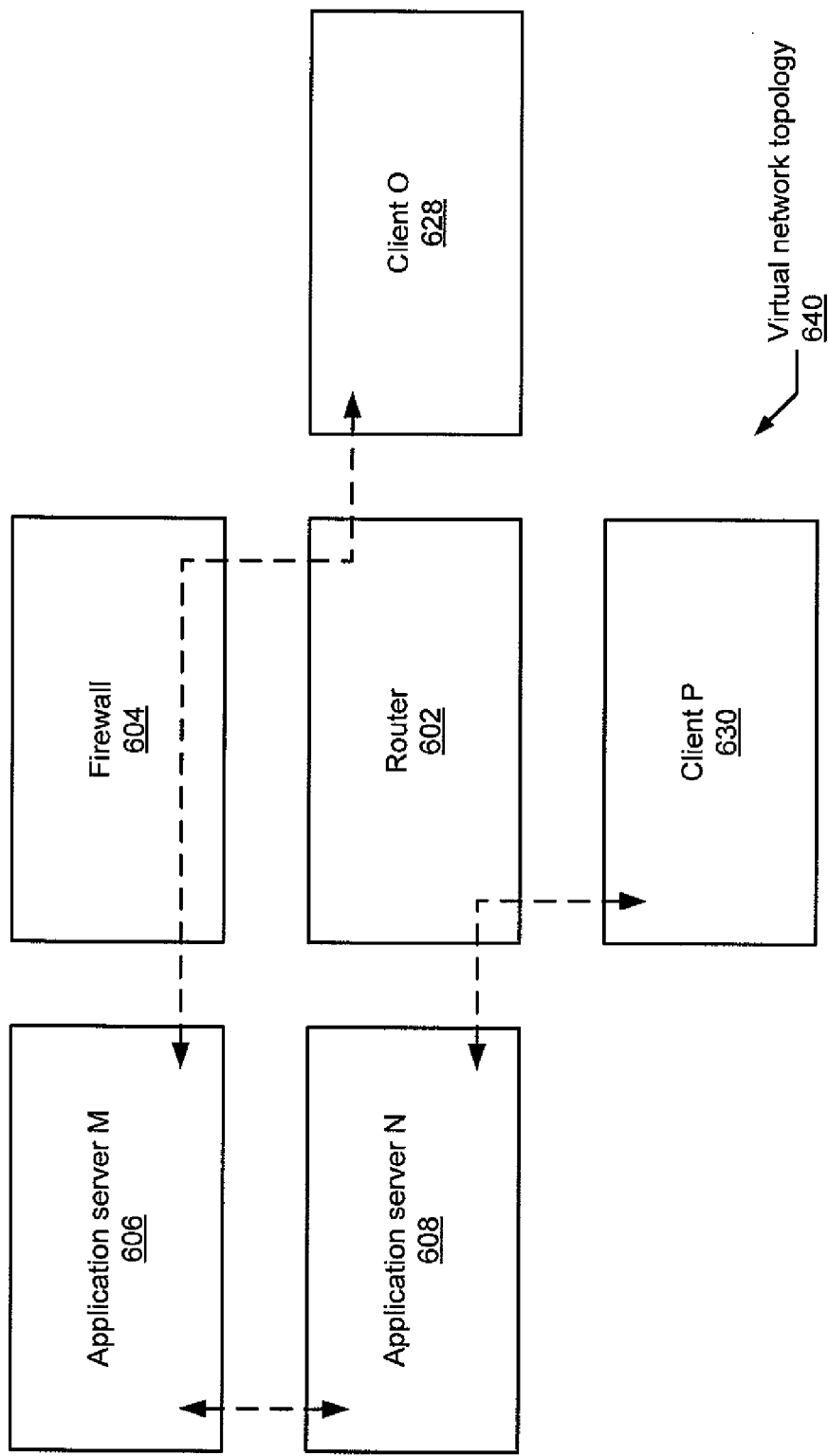

FIGS. 6A-6C show an example of creating virtual network paths in accordance with one or more embodiments of the invention. Specifically, FIG. 6A shows a diagram of an actual topology (600) in accordance with one or more embodiments of the invention, FIG. 6B shows how network traffic may be routed through the actual topology (600), and FIG. 6C shows a virtual network topology (640) created by routing network traffic as shown in FIG. 6B. FIGS. 6A-6C are provided as examples only, and should not be construed as limiting the scope of the invention.

Referring first to FIG. 6A, the actual topology (600) includes multiple virtual machines. Specifically, the actual topology (600) includes a router (602), a firewall (604), application server M (606), and application server N (608), each executing in a separate virtual machine. The virtual machines are located in blades communicatively coupled with a chassis interconnect (622), and include networking functionality provided by the blades via VNICs (i.e., VNIC H (610), VNIC J (612), VNIC K (614), VNIC M (618), and VNIC N (620)). For ease of illustration, the blades themselves are not included in the diagram.

In one or more embodiments of the invention, the router (602), the firewall (604), application server M (606), and application server N (608) are each located in separate blades. Alternatively, as noted above, a blade may include multiple virtual machines. For example, the router (602) and the firewall (604) may be located in a single blade. Further, each virtual machine may be associated with a different number of VNICs than the number of VNICs shown in FIG. 6A.

Continuing with discussion of FIG. 6A, a network express manager (624) is configured to manage network traffic flowing to and from the virtual machines. Further, the network express manager (624) is configured to manage access to a physical network interface (626) used to communicate with client O (628) and client P (630). In FIG. 6A, the virtual machines, VNICs, chassis interconnect (622), network express manager (624), and physical network interface (626) are all located within a chassis interconnect. Client O (628)

and client P (630) are located in one or more networks (not shown) to which the chassis interconnect is connected.

FIG. 6B shows how network traffic may be routed through the actual topology (600) in accordance with one or more embodiments of the invention. In one or more embodiments of the invention, the routing is performed by the network express manager (624) using a virtual switching table (634).

As discussed above, network traffic routed to and from the VNICs may be though of as flowing through a "virtual wire." For example, FIG. 6B shows a virtual wire (632) located between application server M (606) and application server N (608). To use the virtual wire, application server M (606) transmits a network packet via VNIC M (618). The network packet is addressed to VNIC N (620) associated with application server N (608). The network express manager (624) receives the network packet via the chassis interconnect (622), inspects the network packet, and determines the target VNIC location using the virtual switching table (634). If the target VNIC location is not found in the virtual switching table (634), then the network packet may be dropped. In this example, the target VNIC location is the blade in which VNIC N (620) is located. The network express manager (624) routes the network packet to the target VNIC location, and application server N (608) receives the network packet via VNIC N (620), thereby completing the virtual wire (632). In one or more embodiments of the invention, the virtual wire (632) may also be used to transmit network traffic in the opposite direction, i.e., from application server N (608) to application server M (606).

Further, as discussed above, multiple virtual wires may be combined to form a "virtual network path." For example, FIG. 6B shows virtual network path R (636), which flows from client O (628), through the router (602), through the firewall (604), and terminates at application server M (606). Specifically, the virtual network path R (636) includes the following virtual wires. A virtual wire is located between the physical network interface (626) and VNIC H (610). Another virtual wire is located between VNIC J (612) and VNIC K (614). Yet another virtual wire is located between VNIC L (616) and VNIC M (618). If the router (602) and the firewall (604) are located in the same blade, then a virtual switch may be substituted for the virtual wire located between VNIC J (612) and VNIC K (614), thereby eliminating use of the chassis interconnect (622) from communications between the router (602) and the firewall (604).

Similarly, FIG. 6B shows virtual network path S (638), which flows from client P (630), through the router (602), and terminates at application server N (608). Virtual network path S (638) includes a virtual wire between the physical network interface (626) and VNIC H (610), and a virtual wire between VNIC J (612) and VNIC N (620). The differences between virtual network path R (636) and virtual network path S (638) exemplify how multiple virtual network paths may be located in the same blade chassis.

In one or more embodiments of the invention, VNIC settings are applied separately for each virtual network path. For example, different bandwidth limits may be used for virtual network path R (636) and virtual network path S (638). Thus, the virtual network paths may be thought of as including many of the same features as traditional network paths (e.g., using Ethernet cables), even though traditional network wires are not used within the blade chassis. However, traditional network wires may still be required outside the blade chassis, for example between the physical network interface (626) and client O (628) and/or client P (630).

FIG. 6C shows a diagram of the virtual network topology (640) resulting from the use of the virtual network path R (636), virtual network path S (638), and virtual wire (632) shown in FIG. 6B. The virtual network topology (640) allows the various components of the network (i.e., router (602), firewall (604), application server M (606), application server N (608), client O (628), and client P (630)) to interact in a manner similar to a traditional wired network. However, as discussed above, communication between the components located within the blade chassis (i.e., router (602), firewall (604), application server M (606), and application server N (608)) is accomplished without the use of traditional network wires.

Figure 7:
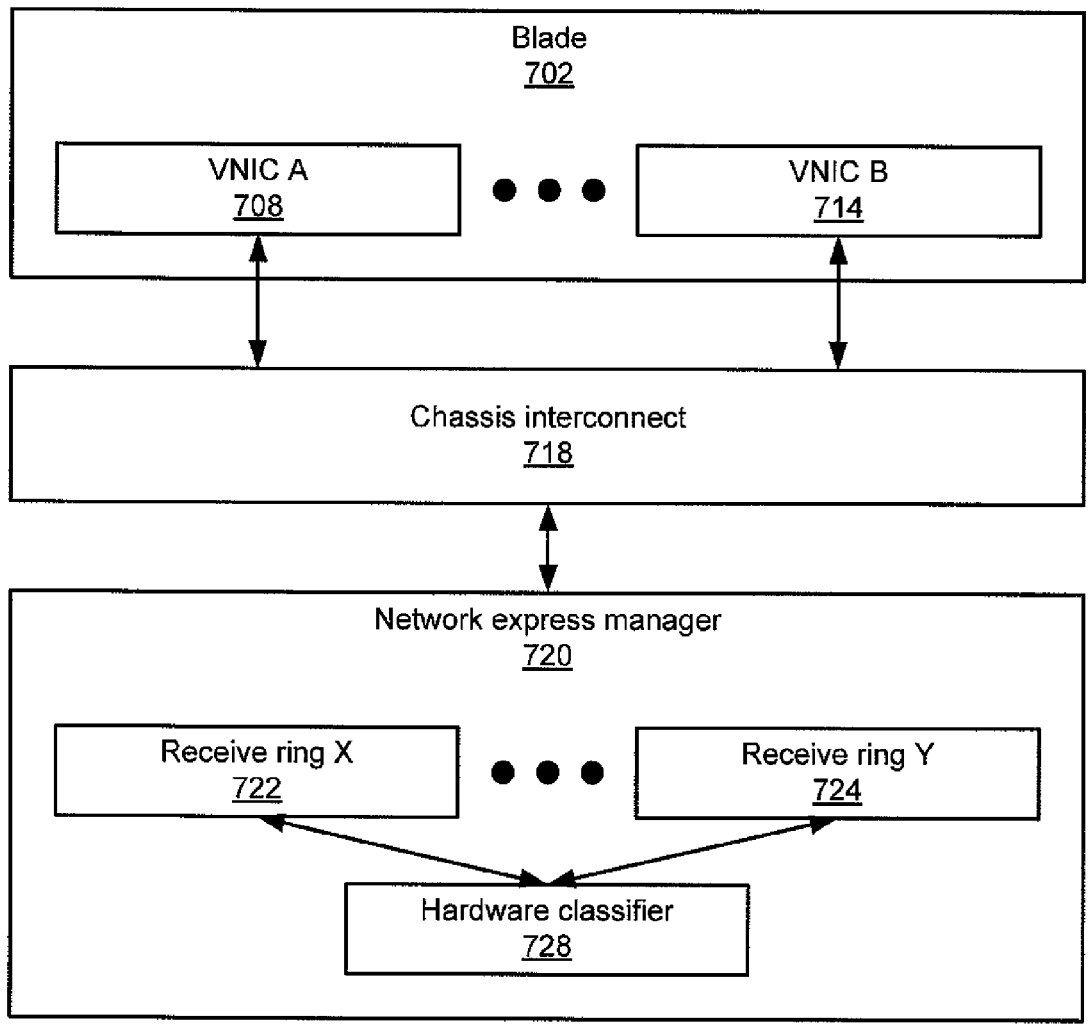
FIGS. 7-9 show diagrams of systems in accordance with one or more embodiments of the invention.

As discussed above, in one or more embodiments of the invention, a network express manager is configured to manage network traffic in a blade chassis. For example, FIG. 7 shows a diagram of a system in accordance with one or more embodiments of the invention. The system includes a chassis interconnect (718) with which a blade (702) and a network express manager (720) are communicatively coupled. In one or more embodiments of the invention, the blade (702), the chassis interconnect (718), and the network express manager (720) are all located within a single blade chassis (not shown). Further, as discussed above, the blade chassis may include multiple blades (not shown).

In one or more embodiments of the invention, the blade (702) includes multiple VNICs (e.g., VNIC A (708), VNIC B (714)). Further, as discussed above, multiple VNICs may be located in multiple blades. Each VNIC may be associated with a virtual machine or another type of virtualized environment. In one or more embodiments, the VNICs receive network traffic (for example, using polling and/or interrupts) from receive rings (e.g., receive ring X (722), receive ring Y (724)) managed by the network express manager (720). Specifically, in one or more embodiments, the network express manager (720) includes a hardware classifier (728) configured to classify network traffic in the form of individual packets and store the packets in the appropriate receive rings.

In one or more embodiments of the invention, one or more of the receive rings are designated as "local" receive rings, and one or more of the receive rings are designated as "forwarding" receive rings. The concept of local and forwarding receive rings is discussed in detail below. Further, in one or more embodiments of the invention, each receive ring is uniquely associated with a particular VNIC. Alternatively, two or more VNICs may "share" a particular receive ring. For example, multiple VNICs may share a forwarding receive ring, thereby allowing the VNICs to distribute processing of forwarding traffic.

Figure 8:
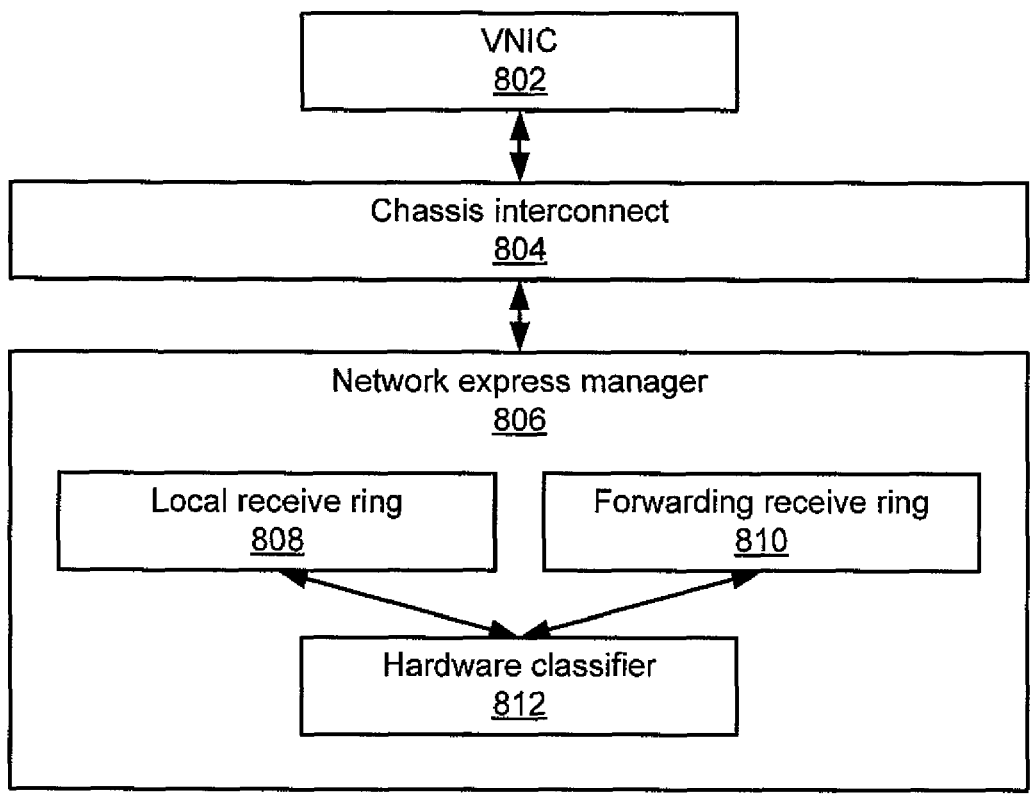

As noted above, in one or more embodiments of the invention, one or more receive rings are designated as local receive rings, and one or more receive rings are designated as forwarding receive rings. For example, FIG. 8 shows a system in accordance with one or more embodiments of the invention. Specifically, FIG. 8 shows a VNIC (802) having an associated local receive ring (808) and forwarding receive ring (810). Although not shown in FIG. 8, the VNIC is located within a blade or another type of computer communicatively coupled with a network express manager (806) via a chassis interconnect (804).

In one or more embodiments, the network express manager (806) includes a hardware classifier (812) configured to classify a packet as either local traffic or forwarding traffic and store the packet in either the local receive ring (808) or the forwarding receive ring (810) accordingly. In one or more embodiments, to distinguish between local traffic and forwarding traffic, the hardware classifier (812) uses a lookup table (not shown). The lookup table stores local IP addresses that are associated with the VNIC (802), i.e., one or more IP addresses of the VNIC (802) itself. In contrast, a non-local IP address is an IP address that is not associated with the VNIC (802). In one or more embodiments, the VNIC (802) is configured to register its local IP address(es) with the hardware classifier (812).

In one or more embodiments, the hardware classifier (812) is configured to inspect the destination IP address of an incoming packet. If the destination IP address matches a local IP address associated with the VNIC (802) (as indicated by the lookup table), then the packet is considered local traffic and the hardware classifier (812) stores the packet in the local receive ring (808). If the destination IP address does not match a local IP address associated with the VNIC (802), then the VNIC (802) is a forwarding node for the packet, and the hardware classifier (812) stores the packet in the forwarding receive ring (810). As noted above, the forwarding receive ring (810) may be shared by multiple VNICs (not shown).

Figure 9:
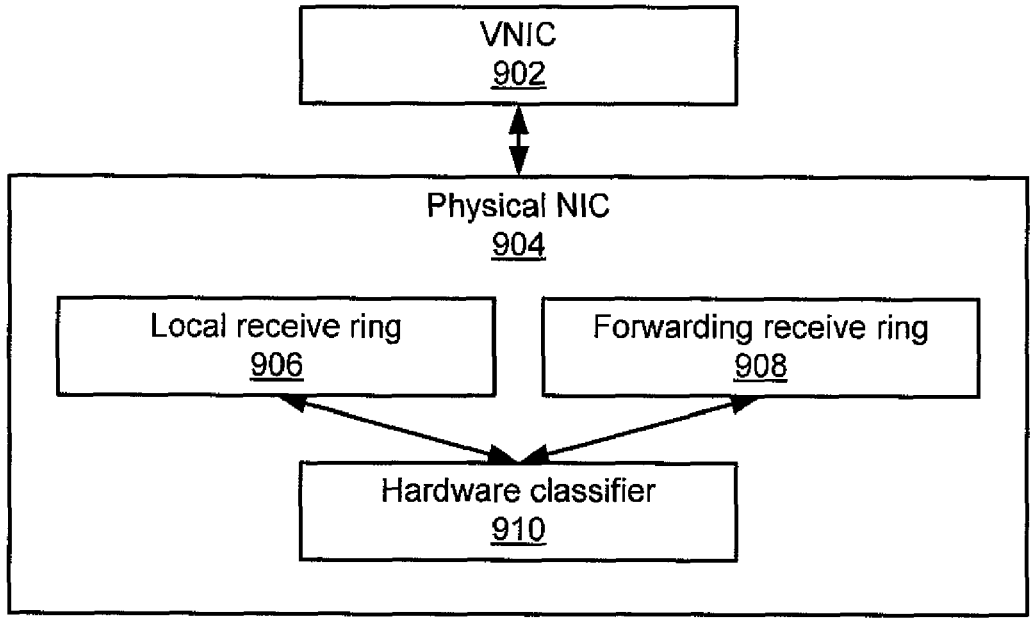

While FIGS. 7 and 8 describe embodiments of the invention using a network express manager, a hardware classifier may alternatively be located in a physical NIC. For example, FIG. 9 shows a diagram of a system in accordance with one or more embodiments of the invention. The system includes a VNIC (902) communicatively coupled with a physical NIC (904). The physical NIC (904) includes a hardware classifier (910), a local receive ring (906) for local traffic, and a forwarding receive ring (908) for forwarding traffic. As above, multiple VNICs (not shown) may be associated with the physical NIC (904), and multiple VNICs may share a receive ring (for example, the forwarding receive ring (908)). In one or more embodiments of the invention, the VNIC (902) and the physical NIC (904) are both located in the same computer.

Figure 10:
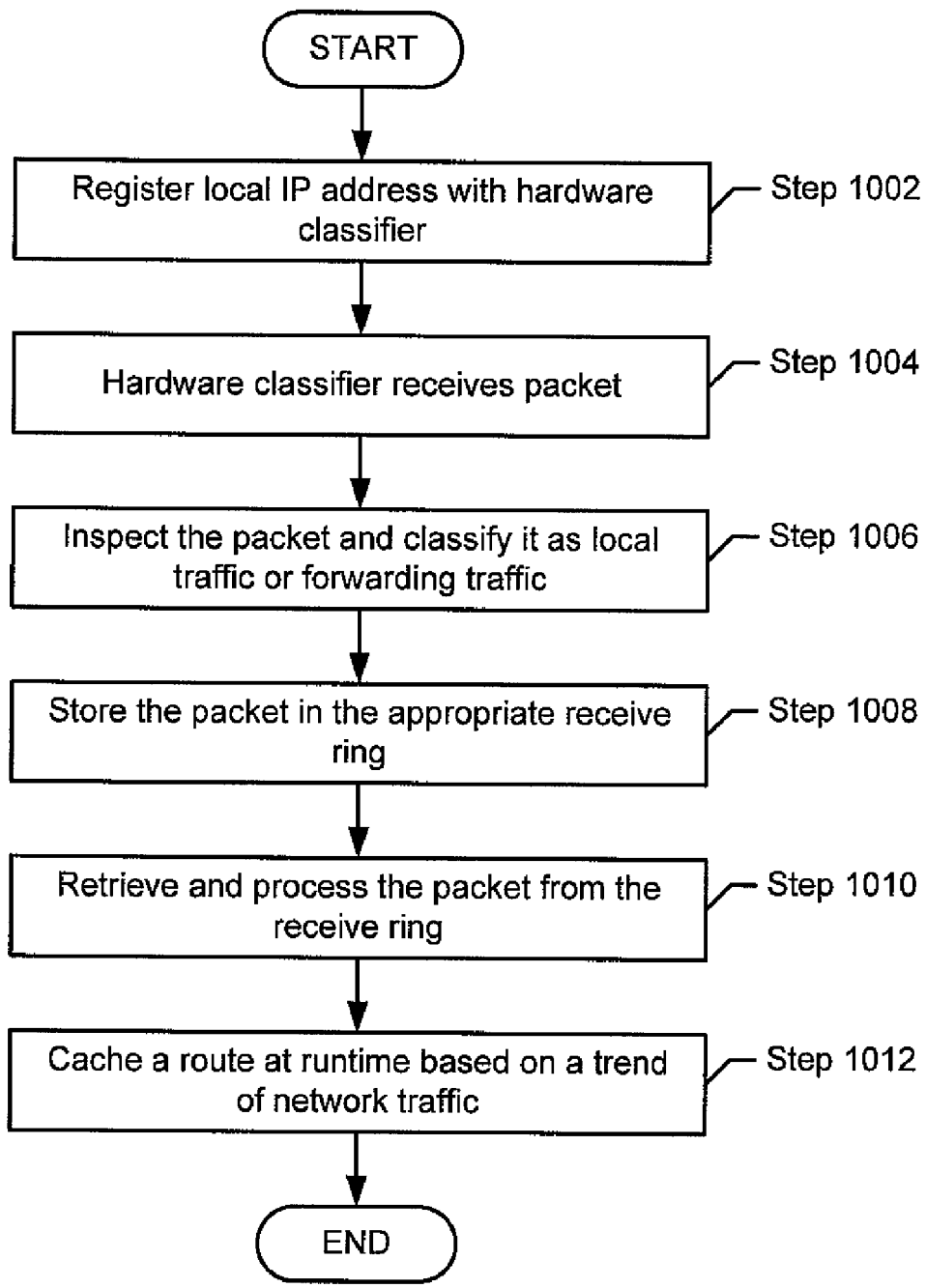
FIG. 10 shows a flowchart of a method for classifying network traffic in accordance with one or more embodiments of the invention.

FIG. 10 shows a flowchart of a method for classifying network traffic in accordance with one or more embodiments of the invention. In one or more embodiments of the invention, one or more of the steps shown in FIG. 10 may be omitted, repeated, and/or performed in a different order than the order shown in FIG. 10. Accordingly, embodiments of the invention should not be considered limited to the specific arrangement of steps shown in FIG. 10.

In one or more embodiments of the invention, in Step 1002, a local IP address associated with a VNIC is registered with a hardware classifier. Specifically, a particular VNIC may have multiple associated local IP addresses, and one or more of the associated local IP addresses may be registered with the hardware classifier. In one or more embodiments of the invention, the hardware classifier stores local IP addresses for one or more VNICs in a lookup table.

In one or more embodiments of the invention, in Step 1004, the hardware classifier receives a packet. The packet includes address information used to route the packet through a network. Specifically, the packet includes a destination IP address (i.e., the IP address of the packet's final destination), and a Media Access Control (MAC) address of the next network "hop," i.e., the next physical NIC or VNIC designated to process the packet. If the next network hop is the final destination, then the destination IP address is associated with the designated physical NIC or VNIC. If the next network hop is not the final destination, then the destination IP address is not associated with the designated physical NIC or VNIC. For the purposes of this discussion, the MAC address is for a VNIC, and the hardware classifier is configured to manage receive rings for the VNIC.

In one or more embodiments of the invention, in Step 1006, the hardware classifier inspects the packet and classifies the packet as either local traffic or forwarding traffic. Specifically, the hardware classifier inspects the MAC address to determine that the packet is addressed to the VNIC, then uses the lookup table to determine whether the IP address is a local IP address for the VNIC. If the IP address is a local IP address of the VNIC, then the packet is local traffic. Otherwise, the packet is forwarding traffic.

In one or more embodiments of the invention, in Step 1008, the hardware classifier then stores the packet in the appropriate receive ring. That is, if the packet is local traffic, then the hardware classifier stores the packet in a local receive ring associated with the VNIC. If the packet is forwarding traffic, then the hardware classifier stores the packet in a forwarding receive ring associated with the VNIC.

In one or more embodiments of the invention, in Step 1010, the VNIC then retrieves (for example, using polling and/or interrupts) the packet from the receive ring, and the packet is processed in a type-specific manner based on the receive ring from which it was retrieved. In other words, local traffic retrieved from the local receive ring is processed differently than forwarding traffic retrieved from the forwarding receive ring. Examples of type-specific packet processing are discussed in detail below regarding FIG. 11.

In one or more embodiments of the invention, type-specific packet processing includes using a route cache, as discussed below. In one or more embodiments of the invention, the route cache may be preconfigured. For example, the route cache may be preconfigured based on a load-balancing strategy or a service level agreement (SLA). An SLA is an agreement between a customer and a service provider about the features, priorities, responsibilities, and/or guarantees associated with the service. For example, an SLA relating to a network service may include guarantees relating to data transfer rates and/or network uptime. Many different types of SLAs exist. Further, in one or more embodiments of the invention, SLAs are associated with specific receive rings managed by the hardware classifier. Thus, one SLA may be associated with one receive ring while another SLA is associated with another receive ring.

Alternatively, in Step 1012, a route may be cached at runtime based on a trend of network traffic. For example, the trend may indicate that a particular route is receiving a large number of packets or packets from a large number of sources. Generally speaking, it may be helpful to cache a particular route when the route accounts for a significant portion of network traffic managed by the hardware classifier. Further, when a group (for example, a burst) of packets is received, the group of packets may be addressed to the same destination IP address. Accordingly, route lookup may be performed only for one of the packets in the group. The remaining packets in the group may then be forwarded to the same location without performing an additional route lookup. In other words, the route may effectively be cached for the remaining packets in the group.

Figure 11:
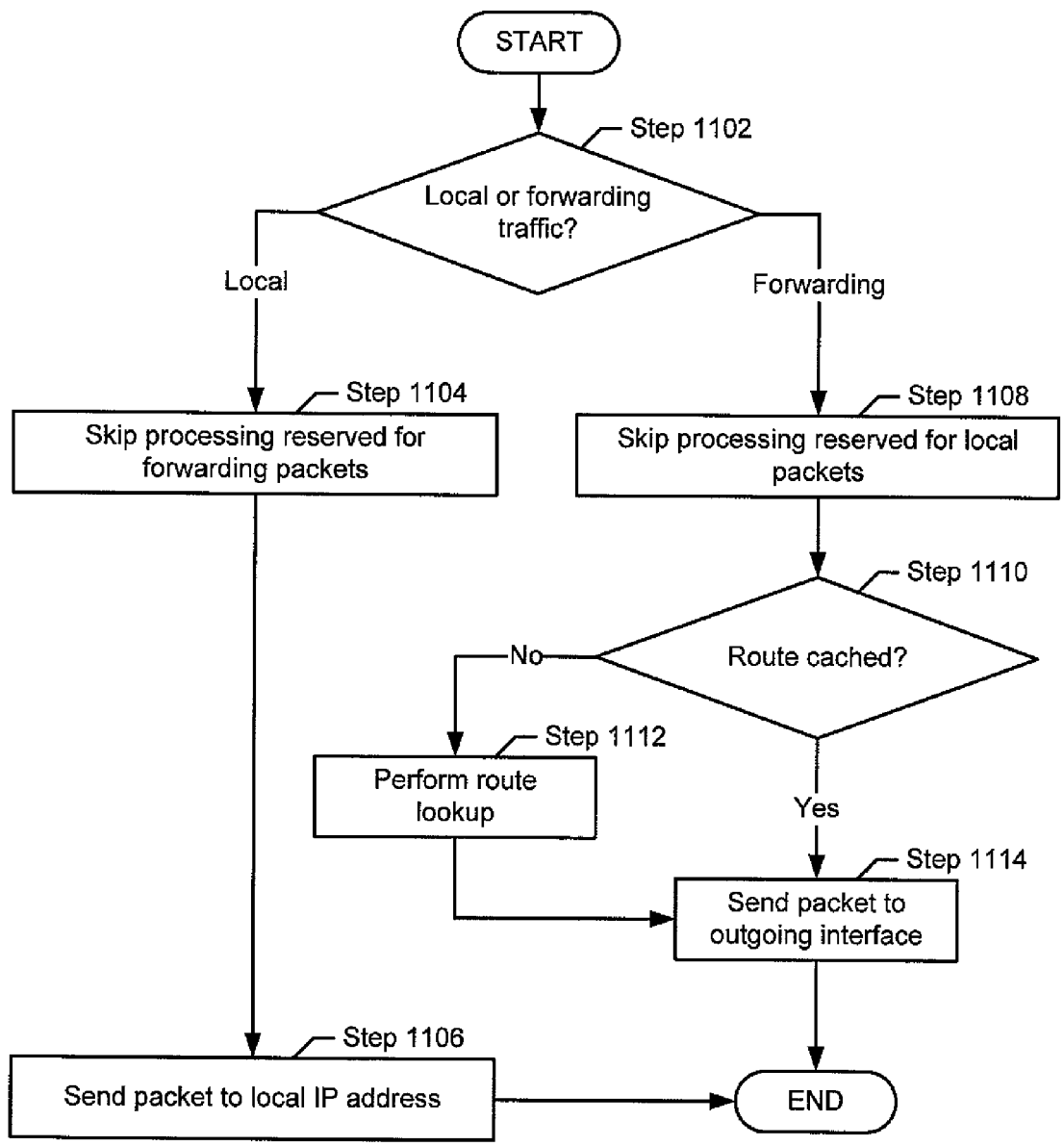
FIG. 11 shows a flowchart of a method for processing a packet in accordance with one or more embodiments of the invention.

As noted above, when packets are retrieved from the receive rings, local traffic and forwarding traffic are processed differently. FIG. 11 shows a flowchart of a method for type-specific packet processing in accordance with one or more embodiments of the invention. In one or more embodiments of the invention, one or more of the steps shown in FIG. 11 may be omitted, repeated, and/or performed in a different order than the order shown in FIG. 11. Accordingly, embodiments of the invention should not be considered limited to the specific arrangement of steps shown in FIG. 11.

In one or more embodiments of the invention, in Step 1102, a determination is made whether the packet is local traffic or forwarding traffic. In one or more embodiments of the invention, the determination is based on which receive ring the packet was retrieved from. Local traffic and forwarding traffic are subsequently processed differently.

Specifically, in one or more embodiments of the invention, if the packet is local traffic, then in Step 1104, processing reserved for forwarding packets is skipped. Such processing may include, for example, route lookup. Since the packet is already known to be local traffic, a route lookup is not required. Accordingly, the route lookup may be skipped, thereby sparing computer resources that would have been required to perform the route lookup. Many different types of packet processing that are helpful for forwarding traffic may not be as helpful for local traffic and may be skipped. In one or more embodiments of the invention, in Step 1106, the local packet is then sent to the local IP address (i.e., the local IP address associated with the VNIC that retrieved the packet from the local receive ring).

In contrast, in one or more embodiments of the invention, if the packet is forwarding traffic, then in Step 1108, processing reserved for local packets is skipped. Such processing may include, for example, checksum validation, client validation, or classifying the connection type associated with the packet. Many different types of packet processing that are helpful for local traffic may not be as helpful for forwarding traffic and may be skipped.

Further, as discussed above, a route cache may be used. In one or more embodiments of the invention, in Step 1110, a determination is made whether the packet's route is cached. Specifically, a route cache may be consulted to determine whether the packet's destination IP address is an endpoint in a cached route. If the route is cached, then a route lookup is not required, and in Step 1114, the packet is sent to the appropriate outgoing interface. However, if the route is not cached, then a route lookup may be required (Step 1112) prior to sending the packet to the outgoing interface (Step 1114).

Figure 12:
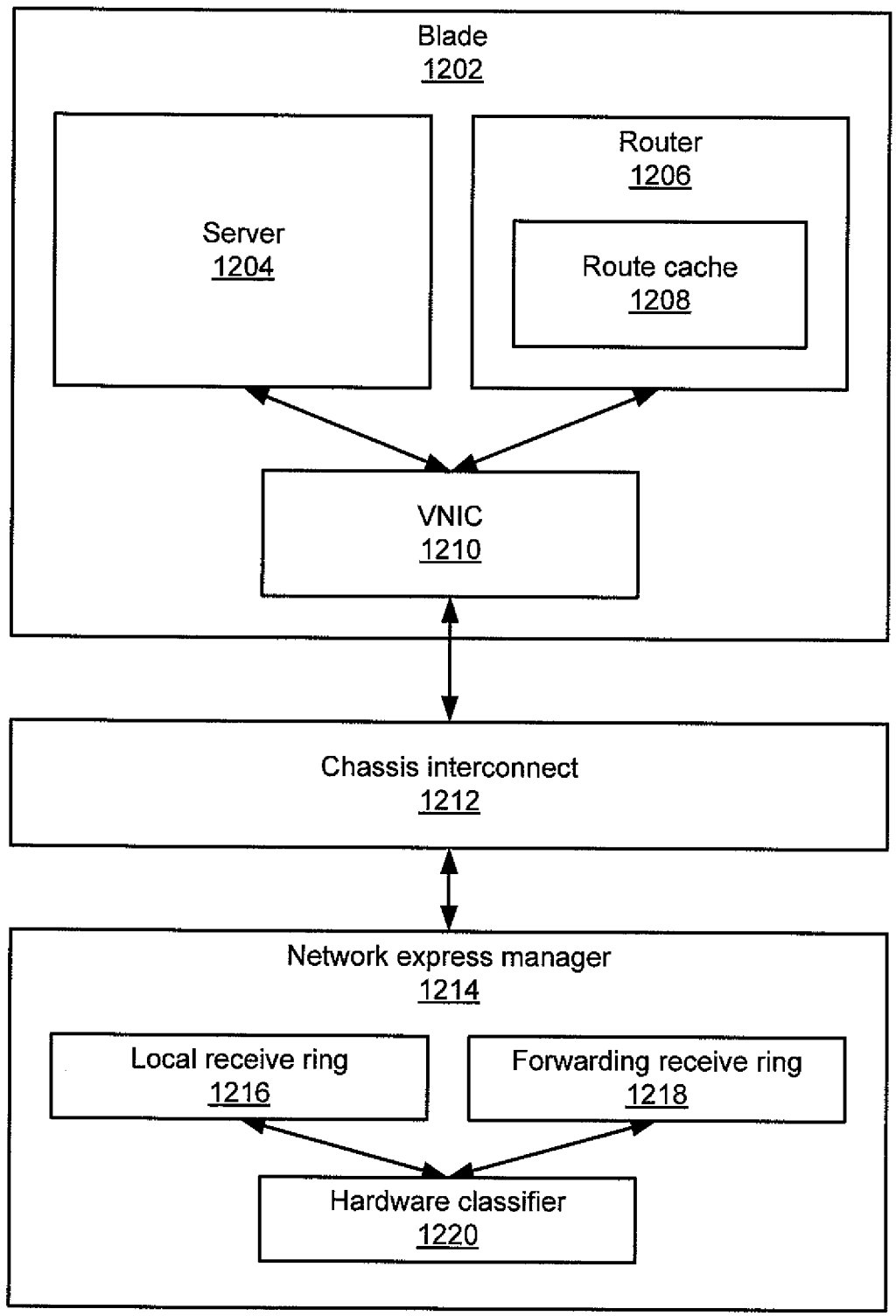
FIG. 12 shows an example of classifying network traffic in accordance with one or more embodiments of the invention.

FIG. 12 shows an example of classifying network traffic in accordance with one or more embodiments of the invention. FIG. 12 and corresponding discussion are provided for exemplary purposes only and should not be construed as limiting the scope of the invention.

In FIG. 12, a blade (1202) is communicatively coupled with a network express manager (1214) via a chassis interconnect (1212). Although not shown in FIG. 12, the blade (1202), the chassis interconnect (1212), and the network express manager (1214) are located within a blade chassis. The blade (1202) includes a VNIC (1210) servicing a server (1204) and a router (1206).

In one or more embodiments of the invention, while the VNIC (1210) has a single MAC address, the server (1204) and the router (1206) each have unique IP addresses associated with the VNIC (1210). In this example, the server (1204) is configured to process received packets locally, while the router (1206) is configured to forward packets to other computers (not shown). Thus, network traffic destined for the server (1204) is considered local traffic, and traffic destined for the router (1206) is considered forwarding traffic. Further, the router (1206) is configured to maintain a route cache (1208). In this example, the route cache (1208) includes one or more pre-configured routes for a customer that has paid for prioritized packet processing. Specifically, the customer has paid for the route to be cached to increase throughput for the route by avoiding the overhead of route lookups.

In this example, network traffic is classified by a hardware classifier (1220) located in the network express manager (1214). Specifically, the hardware classifier (1220) is configured to distinguish between local traffic and forwarding traffic, and store the traffic in either a local receive ring (1216) or a forwarding receive ring (1218) accordingly. The VNIC (1210) is configured to register the IP address associated with the server (1204) with the hardware classifier (1220), thereby indicating that packets having the server's (1204) IP address as a destination IP address qualify as local traffic. Note that a packet with the server's (1204) IP address only qualifies as local traffic if the packet is also addressed to the VNIC's (1210) MAC address. If the packet is addressed to the server (1204) but must be forwarded at least once more before reaching the VNIC (1210), then the packet does not qualify as local traffic.

Consider a scenario in which the hardware classifier (1220) receives a packet addressed to the VNIC's (1210) MAC address and the server's (1204) IP address. Because the destination IP address is associated with the VNIC (1210) in the hardware classifier's (1220) lookup table, the packet is considered local traffic. Therefore, the hardware classifier (1220) stores the packet in the local receive ring (1216). The VNIC (1210) retrieves the packet from the local receive ring (1216) and sends the packet to the server (1204) without performing any processing reserved for forwarding traffic.

Now consider an alternate scenario in which the hardware classifier (1220) receives a packet addressed to the VNIC's (1210) MAC address but an IP address that is not associated with the VNIC (1210) in the hardware classifier's (1220) lookup table. Because the destination IP address is not associated with the VNIC's (1210) MAC address in the lookup table, the packet is considered forwarding traffic. Therefore, the hardware classifier (1220) stores the packet in the forwarding receive ring (1218). The VNIC (1210) retrieves the packet from the forwarding receive ring (1218) and sends the packet to the router (1206) without performing any processing reserved for local traffic. After receiving the packet, the router (1206) determines whether the destination IP address is an endpoint of a route in the route cache (1208). If so, the router (1206) skips route lookup for the packet. In any case, the router (1206) sends the packet to the appropriate outgoing interface (not shown), from which the packet is transmitted to the next network hop in the route.

Embodiments of the invention allow for network traffic to be quickly classified as local traffic and forwarding traffic. Thus, embodiments of the invention help avoid the overhead of route lookup for local traffic. Further, local traffic and forwarding traffic may be processed differently after classification, thereby further reducing overhead associated with packet processing. Generally speaking, embodiments of the invention help reduce the amount of computing resources required to process network packets, thereby freeing those resources for other uses and/or increasing potential network throughput.

Those skilled in the art will appreciate that while the invention has been described with respect to using blades, the invention may be extended for use with other computer systems, which are not blades. Specifically, the invention may be extended to any computer, which includes at least memory, a processor, and a mechanism to physically connect to and communicate over the chassis interconnect. Examples of such computers include, but are not limited to, multi-processor servers, network appliances, and light-weight computing devices (e.g., computers that only include memory, a processor, a mechanism to physically connect to and communicate over the chassis interconnect), and the necessary hardware to enable the aforementioned components to interact.

Further, those skilled in the art will appreciate that if one or more computers, which are not blades, are not used to implement the invention, then an appropriate chassis may be used in place of the blade chassis.

Software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
  a first virtual machine located on a first computer and associated with a first virtual network interface card (VNIC) on the first computer, a second virtual machine located on the first computer and associated the first VNIC and a second VNIC on the first computer, and a third virtual machine located on a second computer associated with a third VNIC on the second computer, wherein the first computer and the second computer are communicatively coupled with each other via a chassis interconnect, wherein the chassis interconnect is a Peripheral Component Interface Express (PCI-E) backplane; and
  a network express manager comprising:
    a a local receive ring for storing local traffic and a forwarding receive ring for storing forwarding traffic, and
    a hardware classifier configured to:
      register a local Internet Protocol (IP) address associated with a first VNIC and a Media Access Control (MAC) address associated with the first VNIC in a lookup table,
      receive a packet comprising the MAC address and a destination IP address,
      classify the packet as a type selected from a group consisting of local traffic and forwarding traffic using the lookup table, wherein the destination IP address matches the local IP address for local traffic and the destination IP address does not match the local IP address for forwarding traffic, and
      store the packet in one selected from a group consisting of the local receive ring and the forwarding receive ring based on the type,
  wherein the first VNIC is configured to:
    retrieve the packet from one selected from a group consisting of the local receive ring and the forwarding receive ring,
    send the packet to the first VM when the packet is retrieved from the local receive ring, and
    send the packet to the second VM when the packet is retrieved from the forwarding receive ring,
  wherein the network express manager is configured to:
    implement a virtual wire connecting the second VNIC to the third VNIC,
  wherein the network express manager implements the virtual wire using a virtual switching table and wherein the virtual switching table comprises a mapping of the second VNIC to a first PCI-E endpoint on the PCI-E backplane and a mapping of the third VNIC to a second PCI-E endpoint on the PCI-E backplane, and
  wherein the first computer is connected to the chassis interconnect at the first PCI-E endpoint and the second computer is connected to the chassis interconnect at the second PCI-E endpoint.

2. The system of claim 1, wherein the forwarding receive ring is one of a plurality of forwarding receive rings associated with a plurality of non-local destination IP addresses, and wherein network traffic for each of the plurality of non-local destination IP addresses is stored in an associated forwarding receive ring selected from the plurality of forwarding receive rings.

3. The system of claim 2, wherein the plurality of forwarding receive rings is preconfigured based on a service level agreement.

4. The system of claim 2, wherein the plurality of forwarding receive rings is configured at runtime based on a trend of network traffic.

5. The system of claim 1, wherein the first VNIC is further configured to:
  populate a route cache of forwarding routes, wherein the route cache comprises a plurality of non-local destination IP addresses, and
  skip route lookup when the destination IP address of the packet matches a non-local IP address selected from the plurality of non-local destination IP addresses.

6. The system of claim 5, wherein the route cache is preconfigured based on a service level agreement.

7. The system of claim 5, wherein the route cache is configured at runtime based on a trend of network traffic.

8. The system of claim 5, wherein the route cache is located in the second virtual machine.

* * * * *